July 22, 1924.
G. A. PURDY
1,502,119
FOOT ACCELERATOR FOR AUTOMOBILES
Filed Oct. 3, 1923
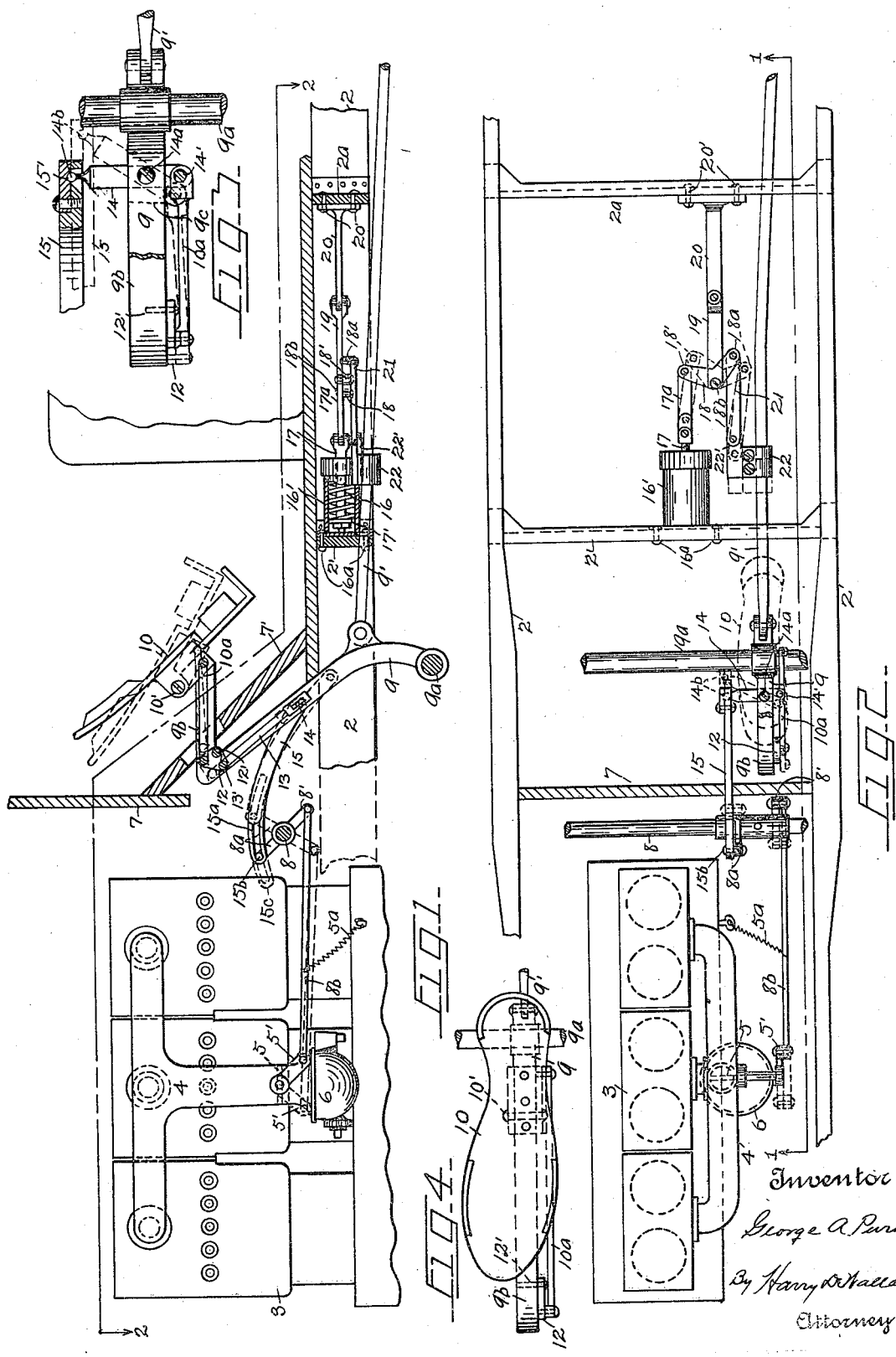

Patented July 22, 1924.

1,502,119

UNITED STATES PATENT OFFICE.

GEORGE A. PURDY, OF WATERTOWN, NEW YORK.

FOOT ACCELERATOR FOR AUTOMOBILES.

Application filed October 3, 1923. Serial No. 666,324.

*To all whom it may concern:*

Be it known that I, GEORGE A. PURDY, a citizen of the United States, residing at Watertown, in the county of Jefferson and State of New York, have invented certain new and useful Improvements in Foot Accelerators for Automobiles, of which the following is a specification.

This invention relates to improvement in foot-accelerators for automobile engines, and my improvement has particular reference to the combining of the brake and throttle controls in a single composite element.

The primary object of the invention is to provide a single pedal, by which the driver of an automobile may independently control the throttle and set the brakes without removing his foot from the pedal. To this end, it is proposed to equip the ordinary angular brake-lever with a foot-rest, which is pivoted to the lever in such manner that it may be rocked in a vertical plane for accelerating the engine, without disturbing the brake mechanism. A further object is to provide novel means by which the foot-rest is operatively connected with the throttle; the arrangement of said means being such that the simple rocking of the foot-rest in opposite directions effects the accelerating or slowing-down of the engine; while the depressing of the brake-lever, for setting the brakes, automatically effects the closing of the throttle and shuts off the explosive gas. And a further object is to provide novel tension means for preventing the accidental depressing of the brake-lever by the force required to rock the foot-rest.

The various features and parts of the invention will be understood from the detailed description which follows, and by reference to the accompanying drawing in which—

Figure 1 is a vertical longitudinal section, taken on line 1—1 of Fig. 2. Fig. 2 is a horizontal section, taken on line 2—2 of Fig. 1. Fig. 3 is an enlarged broken top view of the brake-lever and throttle operating parts. And Fig. 4 is a top plan view of the foot-rest.

In the drawing, 2 represents the chassis of an automobile, including the cross-ties 2' and 2ª. 3 is the engine; 4 the intake manifold, in which the throttle 5 is located, and 6 is the usual carbureter, the throttle being operated by a lever 5'. 7 represents the dash, beneath which is shown a rocking-shaft 8 provided with similar radial arms 8' and 8ª, and 8ᵇ represents a link which connects the arm 8' with the throttle lever 5'. 9 represents the angular brake-lever which operates the usual brake rod 9'. The lower end of lever 9 is supported by a shaft 9ª, which is located below the inclined floor 7', the top end of the brake-lever comprising a horizontal arm 9ᵇ, which extends through a slot in the floor 7', within reach of the driver's feet. Upon the arm 9ᵇ is pivotally mounted a foot-rest 10, by a bolt 10'. The driver usually keeps one foot upon the rest 10 while the automobile is in motion. Fig. 1 shows the brake-lever in the full release position. To set the brakes, the driver forces the top end 9ᵇ, of the lever 9 forwardly and downwardly.

The foot accelerator comprises the foot-rest 10, a link 10ª, one end of which is pivoted to the rest, while its opposite end is pivoted to an equalizer or lever 12, which is pivoted to the brake-lever at 12'. 13 represents a similar link, whose top end is pivoted to the lever 12, by a bolt 13', the lower end of the latter link being pivotally connected to one end of a rocking-lever 14, by a bolt 14'. The lever 14 passes through and is pivoted in a slot 9ᶜ of the brake-lever by a bolt 14ª. The opposite end of the lever 14 is formed with a ball 14ᵇ, which pivots in a socket 15', that is formed in one end of an arc-shaped link 15, the opposite end of said link having a slot 15ª, and being pivoted to the arm 8ª of the rock-shaft 8, by a pin 15ᵇ, which plays in said slot, as shown in Fig. 1.

When the accelerating parts are in the full line position, shown in Fig. 1, the throttle 5 is closed, and the pin 15ᵇ is positioned in the forward end of the slot 15ª, ready for the link 15 to rock the shaft 8 in the direction for opening the throttle, when the parts are shifted. To open the throttle for starting or accelerating the engine, the driver tilts or rocks the foot-rest 10, as from the full line to the dotted line position, shown in Fig. 1. This may be accomplished by the simple wiggling of his foot, without exerting enough pressure to depress the lever 9 which controls the brakes. This tilting of the foot-rest rocks the lever 14 (see Figs. 2 and 3), in the direction for moving the link 15 rearwardly which effects the clock-wise movement of shaft 8 and throttle lever 5', as shown by the dotted lines in Fig. 1. When the foot-rest is tilted in the direction for moving the link 15 forwardly, the throttle closes automatically by a spring 5ª, and during this reverse movement of the link 15, the pin 15ᵇ plays idly in the slot 15ᶜ. It will be understood that the foot-rest only effects the opening movement of the throttle. When the lever 9 is depressed for setting the brakes, the link 15 is moved still farther forwardly as shown by dotted lines 15ᵈ, in Fig. 1. This allows the throttle to close notwithstanding the position of the foot-rest 10. This result is accomplished by means of the slot 15ᶜ, which permits the link 15 to slide on the pin 15ᵇ, and obviates all danger of accelerating the engine while the brakes are being set.

In carrying out the objects of my invention, it is proposed that the driver shall constantly keep his foot on the brake lever 9, and in order to relieve the said lever of the weight of the driver foot and leg, which might cause the accidental depressing of the brake-lever, I provided a novel tension device, which holds the brake-lever in the released position until the driver exerts sufficient pressure on the arm 9ᵇ to overcome the said tension. 16 represent a spring which may be inclosed by a casing 16′, the latter preferably being secured to the cross-tie 2′, by bolts 16ª. 17 represents a rod which passes through the spring 16, its inner end being fitted with a washer 17ˣ, that engages the corresponding end of the spring. The opposite end of rod 17 is pivoted to one end of a link 17ª, whose opposite end is pivoted to an arm 18′, of an equalizer or lever 18. The lever 18 is pivotally mounted on a bar 19, which aligns with and is pivoted to a fixed support 20, the latter being secured to cross-tie 2ª, by bolts 20′. The arm 18ª of the equalizer is pivoted to a link 21, which in turn is pivoted to an arm 22′ of a member 22, which is clamped rigidly to the brake-rod 9′ The normal tension of the spring 16, when the parts are in the relaxed condition, shown by the full lines in Figs. 1 and 2, is, preferably barely sufficient to sustain the weight of the driver's foot, and prevent the accidental depressing of the brake-lever when he rocks the foot-rest 10, and when he sets the brakes, it requires only a slight additional pressure of the foot to overcome the added tension due to the compression of the spring. Ordinarily, the compressing of a spring, like 16, effects a gradual stiffening of the tension, but I overcome this tendency to a considerable extent by means of the equalizer 18, whose arm 18′ swings downwardly on the axis 18ᵇ, instead of outwardly, which tends to neutralize the tension in a well-known manner.

Having thus described my invention, what I claim is—

1. In combination with a throttle and a brake pedal of an automobile, a foot rest pivoted on the brake pedal, the latter having a transverse slot, a lever pivoted in said slot, means connecting one end of the lever to the foot rest, and a play connection between the opposite end of the lever and the throttle.

2. In combination with a throttle, a brake pedal having a transverse slot, a lever pivoted in the slot and extending transversely of the pedal, rockable means on the pedal connected to one end of the lever for being under the control of the foot, a link connected to the opposite end of the lever and formed with a slot in one end portion, means connecting the slotted end of the link to the throttle including a pin slidably engaged in the slot of said link, and tensioning means for the brake pedal acting in an auxiliary capacity to the usual brake pedal spring to hold the brake pedal in its normal position under the normal weight of the foot of the operator.

3. The combination with a gas engine, a throttle for controlling the same, and a brake-lever adapted to be depressed for setting brakes, of a foot-rest mounted on said brake-lever and tiltable in a vertical plane for effecting the opening and closing of said throttle, tension means for holding said brake-lever in the released position while the foot-rest is being tilted and comprising a rockable lever, swinging means on which the lever is fulcrumed, means connecting one end of the lever to the brake lever, and a tension device connected to the opposite end of the lever, and means for automatically closing the throttle whenever the brake-lever and foot-rest are simultaneously depressed.

In testimony whereof I affix my signature.

GEORGE A. PURDY.